(12) United States Patent
Hall et al.

(10) Patent No.: US 10,108,218 B2
(45) Date of Patent: Oct. 23, 2018

(54) BRAKE ASSEMBLY FOR RETROFITTING A MOTOR VEHICLE WITH A DUAL-POSITION BRAKE SYSTEM

(71) Applicant: Fontaine Modification Company, Charlotte, NC (US)

(72) Inventors: Brandon Hall, Concord, NC (US); Josh Haynes, Lincolnton, NC (US)

(73) Assignee: Fontaine Modification Company, Charlotte, NC (US)

( * ) Notice: Subject to any disclaimer, the term of this patent is extended or adjusted under 35 U.S.C. 154(b) by 0 days.

(21) Appl. No.: 15/584,517

(22) Filed: May 2, 2017

(65) Prior Publication Data

US 2017/0344048 A1 Nov. 30, 2017

Related U.S. Application Data

(60) Provisional application No. 62/341,409, filed on May 25, 2016.

(51) Int. Cl.

| *B60K 26/00* | (2006.01) |
| *G05G 1/34* | (2008.04) |
| *B60T 11/16* | (2006.01) |
| *B60T 7/06* | (2006.01) |
| *B60K 35/00* | (2006.01) |

(52) U.S. Cl.
CPC .................. *G05G 1/34* (2013.01); *B60T 7/06* (2013.01); *B60T 11/16* (2013.01); *B60K 35/00* (2013.01)

(58) Field of Classification Search
CPC .. G05G 1/34; B60T 7/06; B60T 11/16; B60K 35/00

USPC .......... 180/322; 188/105, 106 F, 141, 151 R, 188/345; 74/512, 532
See application file for complete search history.

(56) References Cited

U.S. PATENT DOCUMENTS

| 2,166,978 | A | * | 7/1939 | Stack | ..................... B60K 23/00 |
| | | | | | 180/322 |
| 2,590,144 | A | | 3/1952 | Alward | |
| 2,720,121 | A | | 10/1955 | Holum | |
| 2,799,181 | A | | 7/1957 | Speckman | |

(Continued)

OTHER PUBLICATIONS

U.S. Department of Transportation: Federal Motor Carrier Safety Administration, Federal Motor Vehicle Safety Standard Section 571.105, S6.13, Apr. 12, 2013.

*Primary Examiner* — Toan C To
(74) *Attorney, Agent, or Firm* — Andrus Intellectual Property Law, LLP (57) ABSTRACT

An assembly for actuating a vehicle's brake system from a dual-driver position includes an auxiliary brake pedal coupled to the vehicle remotely from the primary brake pedal. A master cylinder's piston is actuated when the auxiliary brake pedal pivots, and a hydraulic line provides hydraulic fluid to and removes hydraulic fluid from a slave cylinder in response. A lever is provided near the primary brake pedal and has one end coupled to the slave cylinder. The lever pivots in response to provision or removal of hydraulic fluid to or from the slave cylinder. A connector is coupled to the lever's opposite end and moves with the lever. The connector is coupled to a movable member that directly applies force to a rod of a primary brake system actuator and applies force to the movable member at the same location where the primary brake pedal applies force to the movable member.

22 Claims, 10 Drawing Sheets

(56) References Cited

U.S. PATENT DOCUMENTS

| | | | |
|---|---|---|---|
| 2,814,212 | A | 11/1957 | Garver |
| 3,067,842 | A | 12/1962 | Smith |
| 3,075,602 | A | 1/1963 | Lanzone |
| 3,076,314 | A | 2/1963 | Stromberg |
| 3,313,110 | A | 4/1967 | Von Rohr |
| 3,339,363 | A | 9/1967 | Quayle |
| 3,435,703 | A | 4/1969 | Allgaier |
| 3,877,299 | A | 4/1975 | Clayton, Sr. et al. |
| 3,943,795 | A * | 3/1976 | Kenney .................. B60T 7/06 74/479.01 |
| 4,312,246 | A | 1/1982 | Barresi |
| 4,497,175 | A * | 2/1985 | Temperley ............ B60T 11/20 60/581 |
| 4,896,736 | A | 1/1990 | Smith |
| 5,299,668 | A * | 4/1994 | Youngers ............ B60T 17/223 188/352 |
| 5,964,122 | A | 10/1999 | Bonnard et al. |
| 6,435,055 | B1 | 8/2002 | Sato |
| 7,207,238 | B2 | 4/2007 | Feng |
| 9,840,243 | B2 * | 12/2017 | Saito .................... B60T 11/18 |
| 2003/0106754 | A1 * | 6/2003 | Buckley ................ B60T 1/065 188/359 |
| 2004/0040400 | A1 | 3/2004 | Pilz |
| 2016/0031422 | A1 * | 2/2016 | Gotoh .................... B60T 7/06 60/594 |
| 2017/0072920 | A1 * | 3/2017 | Besier .................... B60T 7/22 |
| 2017/0217473 | A1 * | 8/2017 | Higashiguchi ........ B60K 37/04 |
| 2018/0093648 | A1 * | 4/2018 | Pennala ................ B60T 7/06 |

\* cited by examiner

BRAKE ASSEMBLY FOR RETROFITTING A MOTOR VEHICLE WITH A DUAL-POSITION BRAKE SYSTEM

CROSS-REFERENCE TO RELATED APPLICATION

The present application claims the benefit of and priority to U.S. Provisional Application Ser. No. 62/341,409, filed on May 25, 2016, which is hereby incorporated by reference herein.

FIELD/BACKGROUND

The present disclosure relates to brake systems and assemblies for motor vehicles.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

Embodiments of supplemental braking assemblies according to the present disclosure use hydraulic force to actuate the original equipment manufacturer (OEM) brake master cylinder. The embodiments provided herein use dual master cylinders with dual slave cylinders and a transfer bar or lever to directly actuate the OEM part at the same location where the OEM brake pedal actuates the OEM part. The embodiments disclosed herein can be used in vehicles equipped with hydraulic brakes or vehicles equipped with air brakes.

According to one example of the present disclosure, an assembly for actuating a brake system of a vehicle from a dual-driver position includes an auxiliary brake pedal pivotally coupled to the vehicle remotely from a location of a primary brake pedal associated with the brake system. An auxiliary master cylinder has a piston that is actuated by pivoting of the auxiliary brake pedal. A hydraulic line couples the auxiliary master cylinder to an auxiliary slave cylinder and provides hydraulic fluid to the auxiliary slave cylinder from the auxiliary master cylinder or removes hydraulic fluid from the auxiliary slave cylinder to the auxiliary master cylinder in response to actuation of the auxiliary master cylinder's piston. A lever is pivotally coupled to the vehicle proximate the location of the primary brake pedal and has a first end coupled to the slave cylinder. The lever pivots in response to provision or removal of hydraulic fluid to or from the auxiliary slave cylinder. A connector is coupled to a second, opposite end of the lever and moves with the lever as the lever pivots. The connector is configured to be coupled to a movable member that directly applies force to a rod of a primary brake system actuator associated with the primary brake pedal. The connector is configured to apply force to the movable member at a same location where actuation of the primary brake pedal would otherwise apply force to the movable member.

According to another example of the present disclosure, a modified brake system for a vehicle includes a primary brake system actuator controlling brakes of the vehicle in response to pivoting of a primary brake pedal. A movable member directly actuates a rod of the primary brake system actuator as the primary brake pedal pivots. An auxiliary brake pedal is pivotally coupled to the vehicle at a location that is remote from the primary brake system actuator. An auxiliary master cylinder has a piston that is actuated by pivoting of the auxiliary brake pedal. An auxiliary slave cylinder has a piston coupled to the movable member. A hydraulic line couples the auxiliary master cylinder to the auxiliary slave cylinder and provides hydraulic fluid to the auxiliary slave cylinder from the auxiliary master cylinder or removes hydraulic fluid from the auxiliary slave cylinder to the auxiliary master cylinder in response to actuation of the auxiliary master cylinder's piston. Movement of the auxiliary slave cylinder's piston as hydraulic fluid is provided to or removed from the auxiliary slave cylinder applies force to the movable member at a same location where actuation of the primary brake pedal would otherwise apply force to the movable member, thereby applying force to the rod of the primary brake system actuator.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
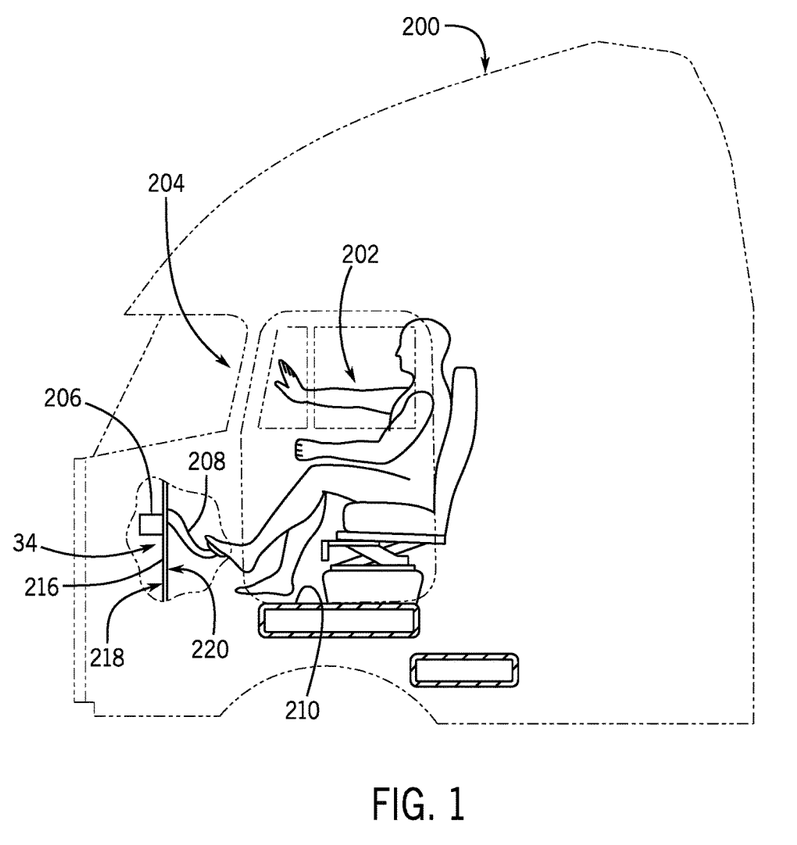
FIG. 1 illustrates a cab of a vehicle and shows the vehicle's primary brake pedal and primary brake system actuator.

Referring to FIG. 1, dual driving positions are required in a motor vehicle 200 (e.g., truck) that is used for special purposes (e.g., street sweeping, garbage collection, etc.). The dual driving positions need to be able to actuate the vehicle's brake system, steering system, throttle system, and other related controls from both the driver's side 202 and the passenger's side (on the far side of the driver's side 202) of the vehicle's cab 204. Existing trucks can be retrofitted to provide a dual-driving position on the passenger's side of the cab 204 where one did not previously exist. The assembly of the present disclosure uses a remotely mounted foot pedal to actuate a vehicle's original equipment manufacturer (OEM) brake system by way of actuating the OEM primary brake system actuator 206 (e.g., a brake valve or master cylinder) at the same point where the OEM primary brake pedal 208 actuates the primary brake system actuator 206.

Previous attempts to achieve dual actuation of hydraulic brake systems failed to provide enough force to fully comply with Federal Motor Vehicle Safety Standards (FMVSS) 105 standards. These standards include control force requirements, prescribed stopping distances, and other brake system requirements based on vehicle type, weight, etc. For example, FMVSS 105, 56.13 states that the force applied to a brake control cannot be less than 15 pounds and not more than 150 pounds. Attempts to tap into the existing hydraulic lines of a hydraulic brake system did not comply with such regulations, because tapping into the lines created too much restriction in the system to provide the necessary pressures in the required amount of time. The supplemental brake actuating assemblies of the present disclosure overcome this difficulty by leaving the OEM's hydraulic system intact and instead actuating the OEM's hydraulic system in the same manner and at the same location as the OEM primary brake pedal 208 does. This allows both driving positions to be FMVSS 105 compliant. This in turn allows the semi-permanent modification to the vehicle's OEM brake system described herein to be used on a regular, day-to-day basis.

Figure 2:
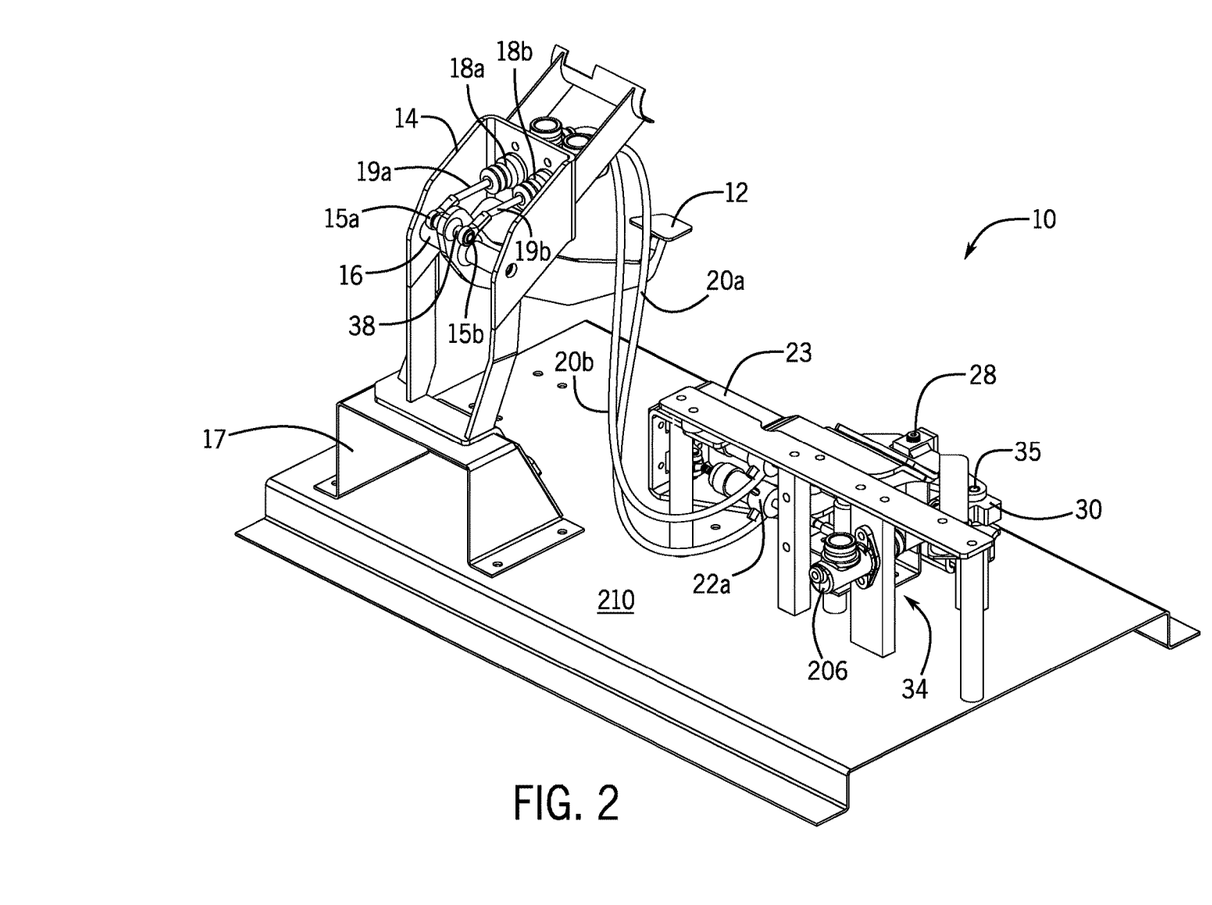
FIG. 2 illustrates a first perspective view a first embodiment of a supplemental brake actuating assembly according to the present disclosure.

Referring also to FIG. 2, a first embodiment of the present supplemental brake actuating assembly 10 for actuating a brake system of a vehicle 200 from a dual-driver position is shown. The assembly 10 includes an auxiliary brake pedal 12 attached to a support 14 by a pivot pin 16. The support 14 is in turn coupled to the vehicle body, such as to the vehicle's interior floor 210, by way of a platform 17. Such connections can be made by way of screws, bolts, or other fasteners being inserted through the holes shown in the support 14 and the platform 17. The auxiliary brake pedal 12 is thus pivotally coupled to the vehicle 200 by way of platform 17, support 14, and pivot pin 16, although various other pivotable arrangements could be provided. For example, the support 14 could be coupled directly to the floor 210 or to an interior side 220 of the vehicle's firewall 216 (FIG. 1), depending on the construction of the vehicle 200. The auxiliary brake pedal 12 is coupled to the vehicle 200 in the foot well on the passenger's side of the cab 204, remotely from a location of the primary brake pedal 208 associated with the vehicle's service brake system. The location of the primary brake pedal 208 is shown in FIG. 2 at 34, near the primary brake system actuator 206, such as a master cylinder or brake valve, and is located on the driver's side 202 of the cab 204.

An upper end of the auxiliary brake pedal 12 is attached to a pair of auxiliary master cylinders 18a, 18b by way of two heim joints 15a, 15b connected to respective piston rods 19a, 19b of each auxiliary master cylinder 18a, 18b. Each auxiliary master cylinder 18a, 18b is connected by way of a hydraulic line 20a, 20b to a respective auxiliary slave cylinder 22a or 22b (see also FIGS. 3 and 4). While the auxiliary master cylinders 18a, 18b are located near the auxiliary brake pedal 12, the auxiliary slave cylinders 22a, 22b are provided at location 34 near the primary brake pedal 208, which is located on the opposite side of the cab 204 from the auxiliary brake pedal 12. However, the two halves (master and slave) of the assembly 10 are shown herein as being close to one another in order to show the connection of their parts. In reality, the hydraulic lines 20a, 20b are much longer and reach from the passenger's side of the cab 204 to the driver's side 202. The hydraulic lines 20a, 20b can be located in the foot well of the cab 204.

Figure 3:
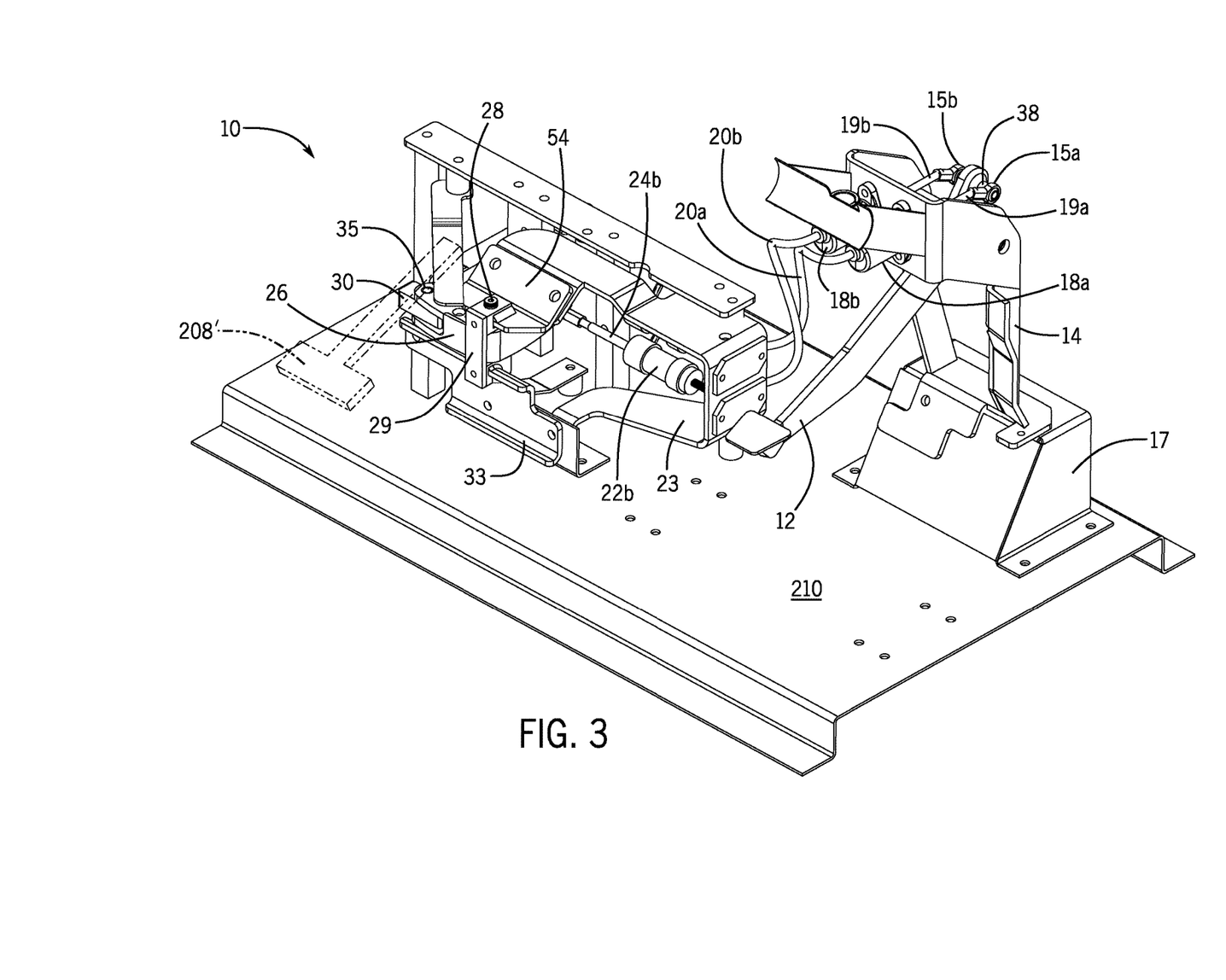
FIG. 3 illustrates a second perspective view of the supplemental brake actuating assembly.
Figure 4:
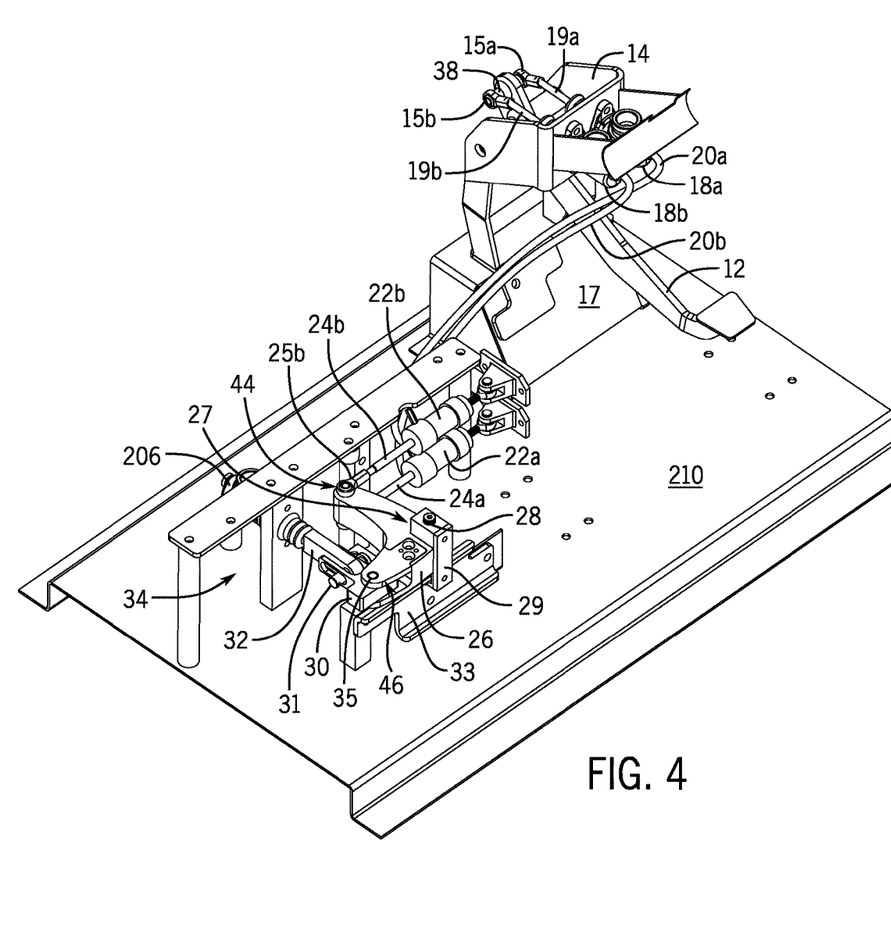
FIG. 4 illustrates a third perspective view of the supplemental brake actuating assembly.

Referring now to FIGS. 3 and 4, stationary ends of the auxiliary slave cylinders 22a, 22b are coupled to another support 23, which may be connected to the vehicle frame (e.g., floor 210) or may be part of the vehicle frame itself. In FIG. 4, the support 23 and several other parts have been removed to better show the auxiliary slave cylinders 22a, 22b and the OEM parts. Piston rods 24a, 24b of the auxiliary slave cylinders 22a, 22b are connected to a first end 44 of a boomerang-shaped lever 26 via heim joints, one of which is shown at 25b. The lever 26 has a bend 27 between the first and second ends thereof and pivots about a generally vertical axis located at the bend 27. Specifically, the lever 26 pivots about pin 28, which is also attached to a stationary support, such as block 29 and bracket 33, or directly to the vehicle frame. The opposite, second end 46 of the lever 26 is coupled to a connector 30 by way of a pin 35. The connector 30 is in turn coupled via a pin 31 to a moveable member 32 that comprises part of the OEM brake system. This movable member 32 actuates the OEM primary brake system actuator 206. In order that both the primary brake pedal 208 and the connector 30 of the present assembly 10 can be coupled to the movable member 32, the pin 31 that is used may need to be longer than the OEM's existing pin that connects the primary brake pedal 208 to the movable member 32. This will be described further herein below.

Referring to FIGS. 2-4 and 6, the auxiliary master cylinders 18a, 18b have pistons 36a, 36b that are actuated by pivoting of the auxiliary brake pedal 12. Specifically, as the auxiliary brake pedal 12 is depressed at its lower end, it pivots with respect to the support 14 around pivot pin 16, and the piston rods 19a, 19b of the auxiliary master cylinders 18a, 18b—by virtue of their connection to the upper end of the auxiliary brake pedal 12 by rod 38—are pushed into the auxiliary master cylinders 18a, 18b, which are held stationary with respect to the support 14. Note that a hydraulic fluid reservoir 40 is in fluid communication with each auxiliary master cylinder 18a, 18b in the pair of auxiliary master cylinders and the hydraulic system is therefore an open one. As the pistons 36a, 36b move with the piston rods 19a, 19b, hydraulic fluid is drained from the reservoir 40 and is pushed from the auxiliary master cylinders 18a, 18b into the hydraulic lines 20a, 20b. Provision of the reservoir 40 ensures no air gets into the hydraulic system and ensures adequate fluid pressure is available to move the OEM parts.

Fluid from the hydraulic lines 20a, 20b then enters the rod ends of the auxiliary slave cylinders 22a, 22b and acts on the pistons 42a, 42b therein, thereby pulling the piston rods 24a, 24b into the auxiliary slave cylinders 22a, 22b. Because the opposite ends of the auxiliary slave cylinders 22a, 22b are held stationary by virtue of being coupled to support 23, the piston rods 24a, 24b pull on the first end 44 of the lever 26, causing it to rotate about the pivot pin 28. This causes the first end 44 of the lever 26 to rotate toward the auxiliary slave cylinders 22a, 22b (clockwise in FIGS. 4 and 6). The second, opposite end 46 of the lever 26, which is coupled to the connector 30, therefore pushes the connector 30 toward the movable member 32, which actuates the primary brake system actuator 206. The primary brake system actuator 206 thereafter actuates the vehicle's brakes 213 in a conventional manner. For example, if the primary brake system actuator 206 is a master hydraulic cylinder, as shown in the example herein, the master cylinder provides brake fluid to the brakes 213. If the primary brake system actuator 206 is a brake valve, the brakes 213 are provided with pressurized air.

Figure 6:
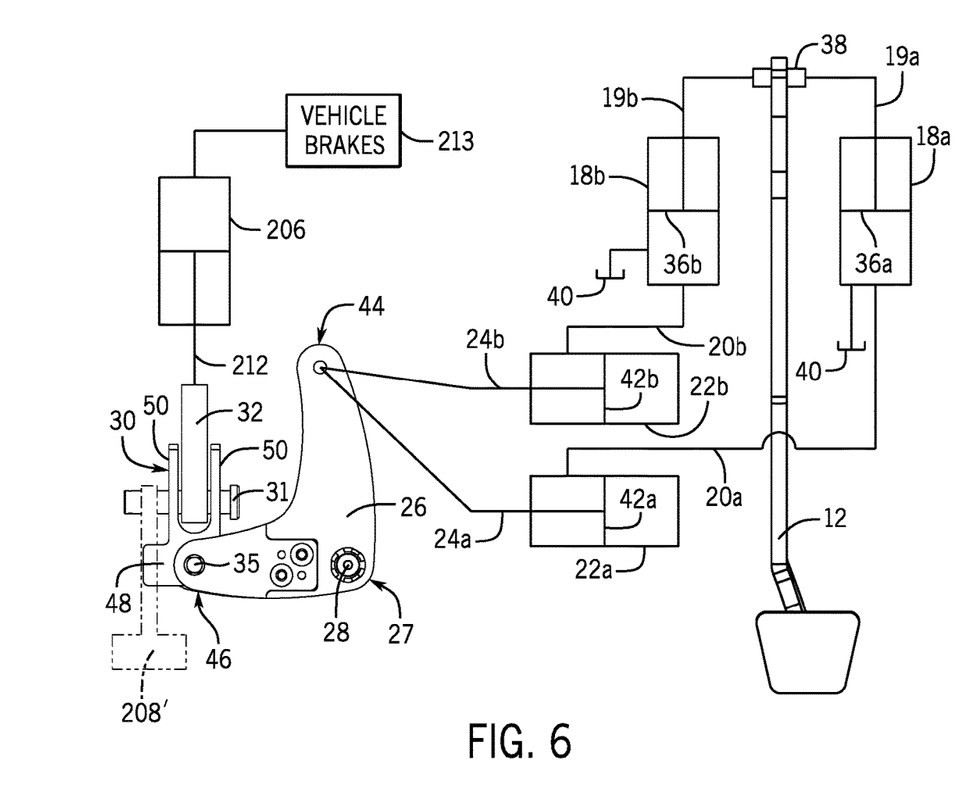
FIG. 6 is a schematic showing hydraulic connections between parts in the first embodiment of the supplemental brake actuating assembly.

Referring to FIG. 6, as noted herein above, the auxiliary master cylinders 18a, 18b are provided with hydraulic fluid from the reservoir 40, and provide and remove this fluid to and from the auxiliary slave cylinders 22a, 22b via the hydraulic lines 20a, 20b. A pair of auxiliary master cylinders 18a, 18b and a pair of auxiliary slave cylinders 22a, 22b are provided in case there is a failure in one of the parallel systems. For example, if a line, part, or connection from first auxiliary master cylinder 18a through first hydraulic line 20a to first auxiliary slave cylinder 22a malfunctions or breaks, the duplicate system comprising parts 18b, 20b, and 22b can still be used to actuate the vehicle's brake system by depressing the auxiliary brake pedal 12. Thus, the assembly 10 includes a pair of auxiliary master cylinders 18a, 18b, each auxiliary master cylinder having a piston 36a, 36b that is actuated by pivoting of the auxiliary brake pedal 12; a pair of auxiliary slave cylinders 22a, 22b, each auxiliary slave cylinder being coupled to the first end 44 of the lever 26; and a pair of hydraulic lines 20a, 20b respectively coupling the pair of auxiliary master cylinders 18a, 18b to the pair of auxiliary slave cylinders 22a, 22b. The pair of hydraulic lines 20a, 20b respectively provide hydraulic fluid to or remove hydraulic fluid from the pair of auxiliary slave cylinders 22a, 22b in response to actuation of the respective pistons 36a, 36b of the auxiliary master cylinders 18a, 18b.

It should be noted that the configuration shown in FIGS. 2-4 and 6 is only one possible assembly configuration and that other configurations may be used depending on the vehicle and the existing OEM brake system. For example, it may be easier to package the auxiliary master cylinders 18a, 18b and auxiliary slave cylinders 22a, 22b on a particular vehicle if all cylinders are pull-type cylinders. In other vehicles, it might be easier to package push-type cylinders for both sets of cylinders. Combinations of push-type and pull-type cylinders could also be used. Thus, the present disclosure contemplates a hydraulic line 20a or 20b coupling the auxiliary master cylinder 18a or 18b to the auxiliary slave cylinder 22a or 22b and providing hydraulic fluid to the auxiliary slave cylinder 22a or 22b from the auxiliary master cylinder 18a or 18b or removing hydraulic fluid from the auxiliary slave cylinder 22a or 22b to the auxiliary master cylinder 18a or 18b in response to actuation of the auxiliary master cylinder's piston 36a or 36b. Correspondingly, the lever 26 that is pivotally coupled to the vehicle 200 proximate the location 34 of the primary brake pedal 208 pivots in response to provision or removal of hydraulic fluid to or from the auxiliary slave cylinder 22a or 22b. The lever 26 may need to be configured differently or installed differently depending on the location of the auxiliary slave cylinders 22a, 22b and whether the auxiliary slave cylinders 22a, 22b are push-type or pull-type cylinders. The auxiliary pedal 12 and its pivot axis might also need to be designed differently to accommodate different arrangements.

FIG. 6 shows the connections between piston rods 19a, 19b and rod 38 schematically, in order to simplify explanation of their relative movement. In actuality, such connection is made by way of heim joints 15a, 15b shown in FIGS. 2-4. Similarly, the connection between piston rods 24a, 24b and first end 44 of lever 26 is shown schematically, although in reality such connection is made on the top and bottom faces of the lever 26 by heim joints such as the one shown at 25b in FIG. 4. Meanwhile, the connections between the primary brake system actuator 206 and the supplemental brake actuating assembly 10 are shown in more detail in FIG. 6. For example, the connector 30 is shown as being coupled to the second end 46 of the lever 26 and, as mentioned above, is moveable with the lever 26 as the lever 26 pivots. In this example, the connector 30 is a clevis. A base 48 of the clevis is coupled to the second end 46 of the lever 26 by the pivot pin 35, and prongs 50 of the clevis are situated on opposite sides of the movable member 32 and coupled thereto by the clevis pin 31.

Figure 5:
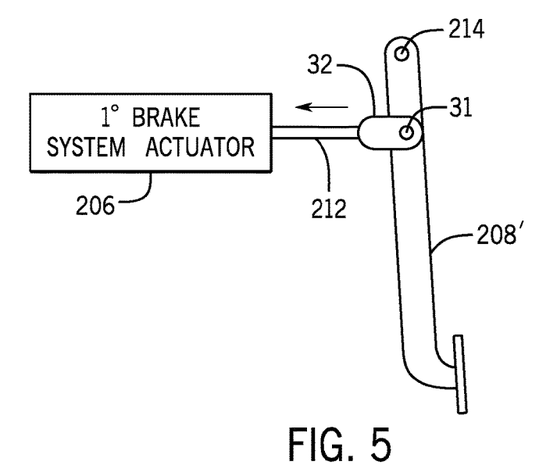
FIG. 5 is a schematic of a first type of primary brake pedal with which the first embodiment of the supplemental brake actuating assembly can be used.

As noted, the connector 30 is coupled to the movable member 32, which directly applies force to and moves a rod 212 of the primary brake system actuator 206 associated with the primary brake pedal 208. This rod 212 could be a piston rod connected to a piston if the primary brake system actuator 206 is a master cylinder, or could be a push rod connected to a plunger if the primary brake system actuator 206 is an air brake valve. Referring briefly to FIG. 5, the layout of the first embodiment of the assembly 10 will work well with a primary brake pedal 208', which comes from the OEM assembled with the movable member 32 for pushing against the rod 212 of the primary brake system actuator 206. The pivot axis of such a primary brake pedal 208' is shown at 214, and is above the connection of the primary brake pedal 208' to the movable member 32. Thus, returning to FIG. 6, the pushing motion of the connector 30 on the clevis pin 31 and thus on the movable member 32 acts in the correct direction on the rod 212 to actuate the primary brake system actuator 206. Note that the clevis pin 31 should be long enough to hold each of the connector 30, movable member 32, and primary brake pedal 208' thereon. Such connection of the clevis pin 31 to the primary brake pedal 208' is shown as being to the side of the prongs 50 of the clevis connector 30, but could instead be made within the prongs 50 of the clevis connector 30, as will be described below with respect to the second embodiment.

Note too that the connector 30 applies force to the movable member 32 at the same location where actuation of the primary brake pedal 208' would otherwise apply force to the movable member 32. This is at the location where the clevis pin 31 extends through the movable member 32. In other words, force can be applied by the clevis pin 31 to the movable member 32 to actuate the primary brake system actuator 206 by a pushing force from the primary brake pedal 208' or by a pushing force from the connector 30 and lever 26. This ability of the supplemental brake actuating assembly 10 to apply force to the OEM movable member 32 at the same location as does the primary brake pedal 208' ensures a compact supplemental assembly. For example, referring to FIG. 3, the auxiliary slave cylinders 22a, 22b, the lever 26, and the clevis connector 30 can be coupled to the vehicle floor 210, for example by way of support 23, block 29, and bracket 33, generally beneath the primary brake pedal 208', shown in phantom. Additionally, this ability of the supplemental brake actuating assembly 10 to apply force to the OEM movable member 32 at the same location as does the primary brake pedal 208' ensures that the assembly 10 is capable of delivering the required control force to the primary brake system actuator 206. For example, by way of selection of the master and slave auxiliary cylinders 18a, 18b and 22a, 22b, the lever 26, and other related force-transmitting components, the assembly 10 is configured to cause the connector 30 to apply force to the movable member 32 that is sufficient to actuate the movable member 32 in response to application of not less than 15 pounds and not more than 150 pounds of operator force to the auxiliary brake pedal 12.

Upon the operator removing his foot from the auxiliary brake pedal 12, the pistons 36a, 36b are moved in the opposite direction as hydraulic fluid enters the auxiliary master cylinders 18a, 18b from the hydraulic lines 20a, 20b and returns to the reservoir 40. The pistons 36a, 36b may also be spring-loaded to aid in their return to their rest positions, if desired. As hydraulic fluid is drained from the auxiliary slave cylinders 22a, 22b via the hydraulic lines 20a, 20b, the pistons rods 24a, 24b and thus the lever 26 are returned to their rest positions, and the movable member 32 is thus moved away from the primary brake system actuator 206, thereby allowing the rod 212 to return to its rest position and deactivating the brakes 213.

Returning to FIG. 1, the vehicle 200 has a firewall 216 at the front of the cab 204, which separates the interior of the cab 204 from the engine and other working parts under the hood. The firewall 216 has an exterior side 218 that faces the engine and an interior side 220 that faces into the cab 204. The firewall 216 is shown in part in FIG. 7, from the exterior side 218. Part of the firewall has been cut away to leave an open space 222, through which a portion of the second embodiment of the supplemental brake actuating assembly 100 of the present disclosure extends. Specifically, the lever 26 is coupled to the exterior side 218 of the firewall 216 of the vehicle 200 in front of the primary brake pedal 208", and the clevis connector 30 extends from the exterior side 218 of the firewall 216 to the interior side 220 of the firewall 216. This allows for a compact assembly 100 that does not take up as much space in the driver's side foot well as does the first embodiment, and also locates the lever 26 for actuation of a second type of primary brake pedal 208", which will be described more fully below.

Figure 7:
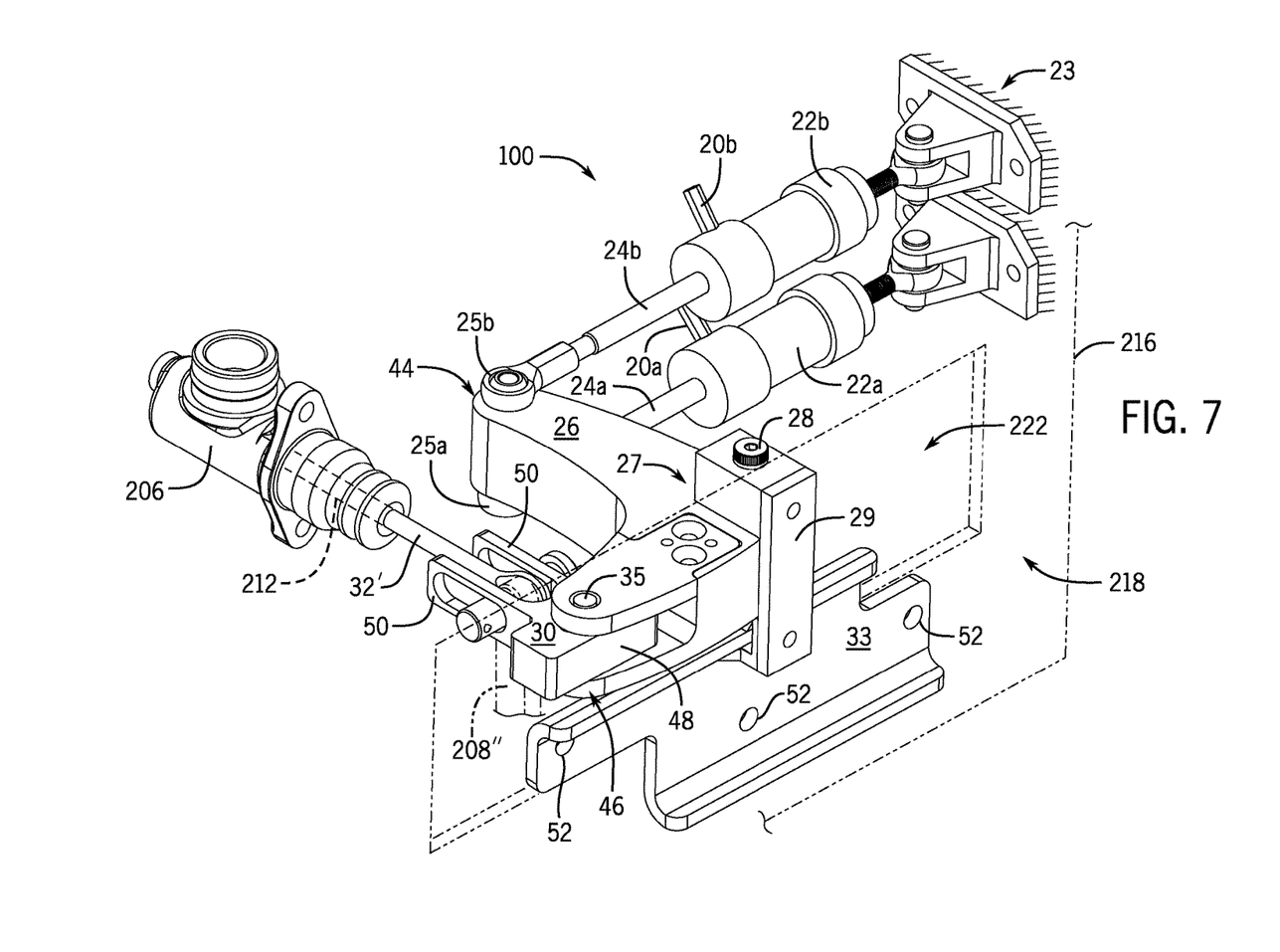
FIG. 7 illustrates a perspective view of a part of a second embodiment of a supplemental brake actuating assembly.

Note that FIG. 7 shows only the portion of the supplemental brake actuating assembly 100 that is at the location 34 of the primary brake pedal 208. This includes the auxiliary slave cylinders 22a, 22b, connected to the first end 44 of the lever 26 by way of their piston rods 24a, 24b; the connector 30 connected at its base 48 by pivot pin 35 to the second end 46 of the lever 26; and block 29, coupled to the bend 27 of the lever 26 by way of pivot pin 28. Block 29 is in turn fastened to bracket 33, which is fastened to the firewall 216 by way of bolts or other fasteners extending through the holes 52 shown therein. The bracket 33 is fastened to the lower edge of the opening 222 in the firewall. Meanwhile, an upper bracket like that shown at 54 in FIG. 3 can be used to fasten the upper end of the block 29 to the firewall 216, although such upper bracket 54 is not shown herein so that the remainder of the assembly 100 can be seen.

Figure 9:
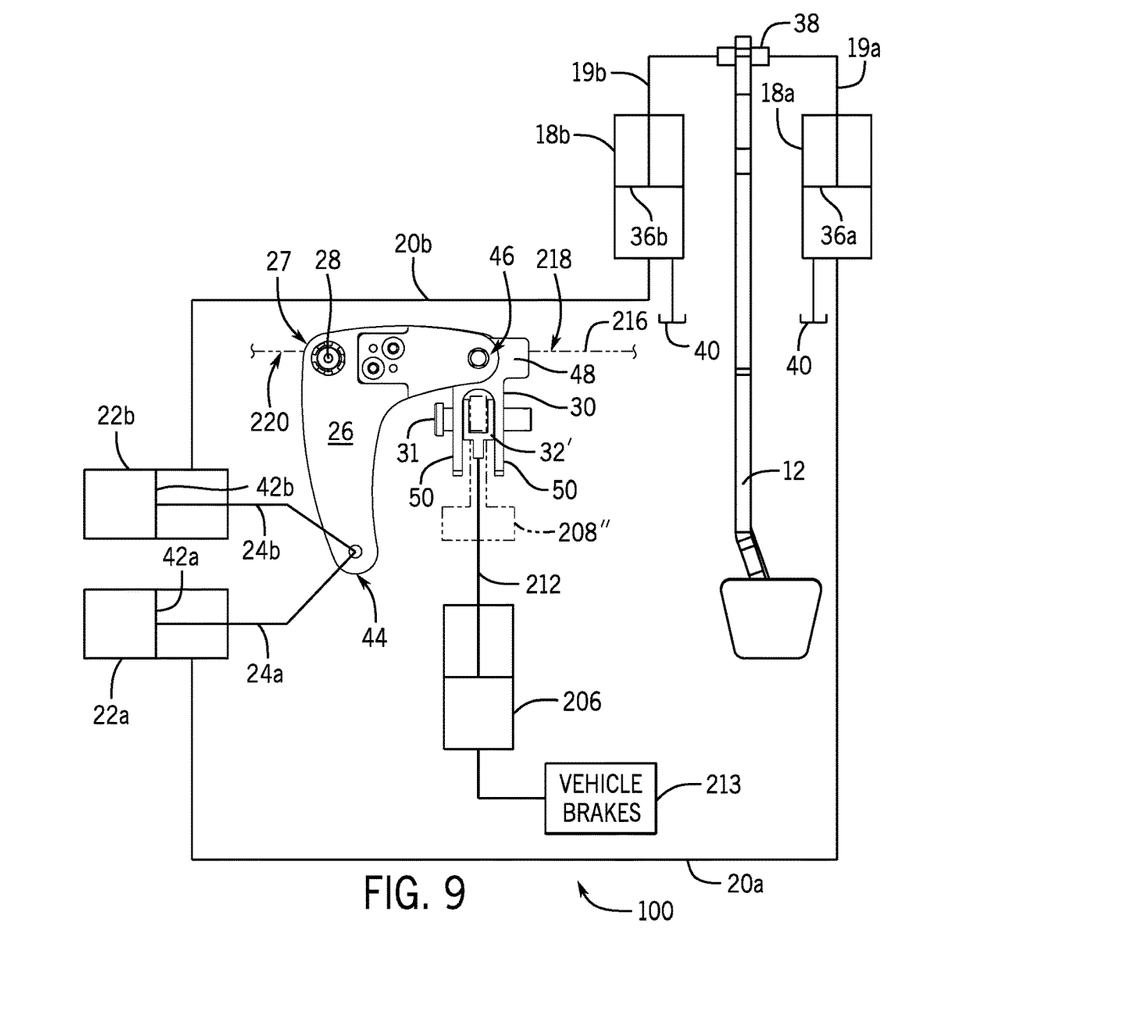
FIG. 9 is a schematic showing hydraulic connections between parts in the second embodiment of the supplemental brake actuating assembly.

FIG. 9 shows a hydraulic diagram of the second embodiment of the supplemental brake actuating assembly 100 according to the present disclosure. Components that are the same as those in the embodiment of FIGS. 2-4 and 6 are provided with the same numbers and will not be described further herein. However, note that the orientation of the lever 26 has been rotated with respect to the orientation of the auxiliary brake pedal 12, which remains as in FIG. 6. Additionally, the auxiliary slave cylinders 22a, 22b have been moved to the opposite side of the lever 26, such that their pistons 42a, 42b now move to the left when fluid is provided to the rod ends of the auxiliary slave cylinders 22a, 22b. This pulls the piston rods 24a, 24b into the auxiliary slave cylinders 22a, 22b and pulls the first end 44 of the lever 26 to the left. Thus, although the orientation of the lever 26 and auxiliary slave cylinders 22a, 22b has changed, the auxiliary slave cylinders are still pull-type cylinders. The lever 26, which is still fixed to the vehicle body by way of pivot pin 28 and block 29 (FIG. 7) at bend 27, rotates clockwise in response to retraction of the piston rods 24a, 24b. This pushes connector 30 toward the primary brake system actuator 206. As was the case in FIG. 6, the piston rods 24a, 24b are shown schematically, and are in fact connected via heim joints 25a, 25b to upper and lower faces of the first end 44 of the lever 26, as shown in FIG. 7.

Figure 8:
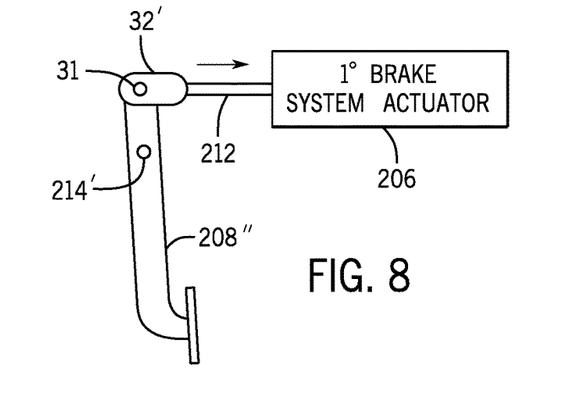
FIG. 8 is a schematic of a second type of primary brake pedal with which the second embodiment of the supplemental brake actuating assembly can be used.

Referring briefly to FIG. 8, the second embodiment of the supplemental brake actuating assembly 100 works well with a primary brake pedal 208" as shown therein. In this example, the primary brake pedal 208" pivots about an axis 214' that is below where clevis pin 31 connects to the movable member 32'. Thus, action on the rod 212 of the primary brake system actuator 206 is in a direction opposite that shown in FIG. 5. The rod 212 is still pushed into or toward the primary brake system actuator 206, however, to release air or hydraulic fluid to actuate the vehicle brakes 213.

Returning to FIG. 9, in order that movement of the primary brake pedal 208" be transmitted to the rod 212 of the primary brake system actuator 206, the movable member 32' comprises a clevis having its base connected to the rod 212 and its prongs connected on either side of where the primary brake pedal 208" is connected to the clevis pin 31. Movement of the primary brake pedal 208" causes movement of the clevis pin 31, which in turn causes movement of the movable member 32', which in turn moves the rod 212. The prongs 50 of the connector 30 are in turn coupled to the clevis pin 31 on either side of the prongs of the clevis-shaped movable member 32'. Thus, movement of the auxiliary slave cylinder's pistons 42a, 42b as hydraulic fluid is provided to or removed from the auxiliary slave cylinders 22a, 22b applies force to the movable member 32' at the same location where actuation of the primary brake pedal 208" would otherwise apply force to the movable member 32', thereby actuating the primary brake system actuator 206. Such force is transmitted by way of the lever 26, which is pivotally coupled to the vehicle 200 proximate the primary brake system actuator 206 and has its first end 44 coupled to the auxiliary slave cylinder's pistons 42a, 42b and pivots in response to hydraulic fluid being provided to or removed from the auxiliary slave cylinders 22a, 22b, and by way of the connector 30 coupled to the second, opposite end 46 of the lever 26 and moveable with the lever 26 as the lever 26 pivots. The connector 30 is coupled to and applies force to the movable member 32' as the lever 26 pivots, and thereby applies force to and moves the rod 212 of the primary brake system actuator 206 by way of clevis pin 31 and movable member 32'.

Figure 10:
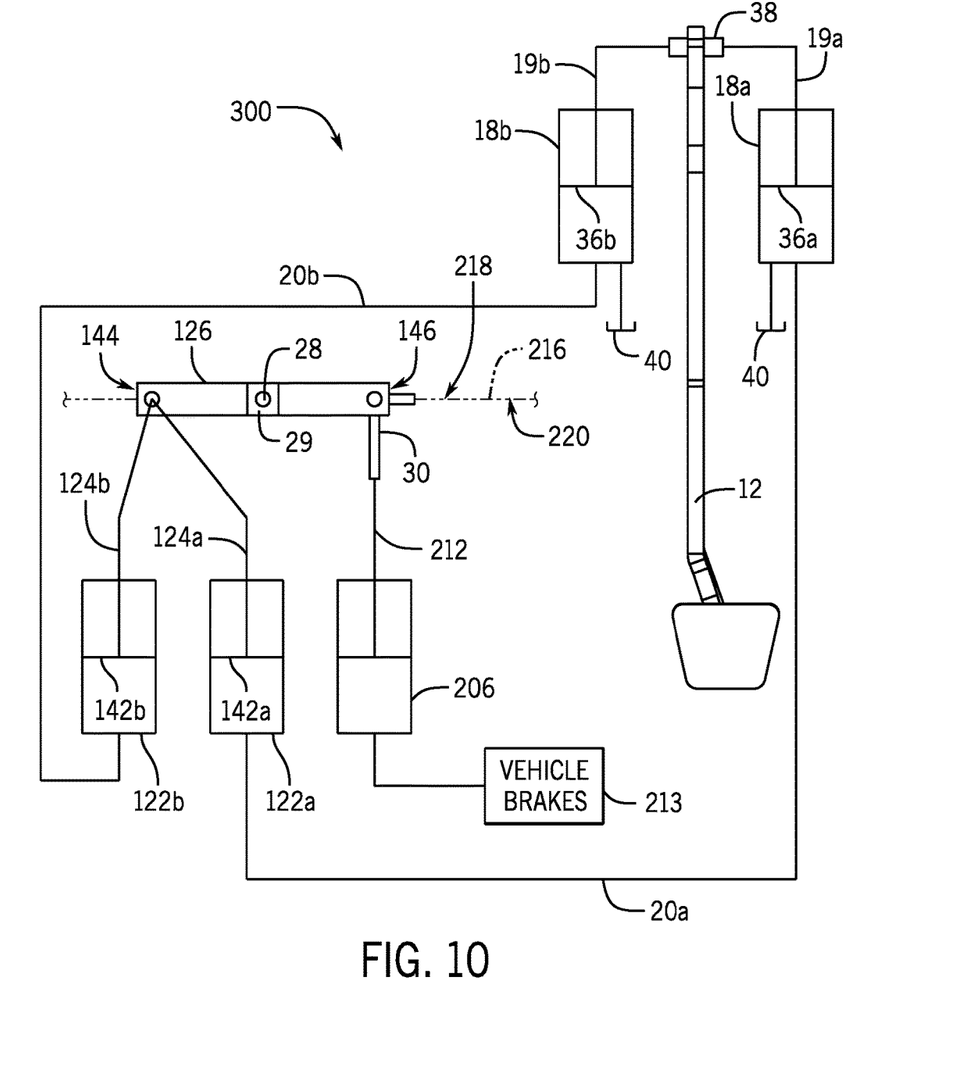
FIG. 10 is a schematic showing hydraulic connections between parts in a third embodiment of the supplemental brake actuating assembly.

FIG. 10 shows a hydraulic diagram of a third embodiment of a supplemental brake actuating assembly 300 according to the present disclosure. All elements labeled with the same numbers as in FIGS. 6 and 9 are the same in FIG. 10, and will not be described further herein. This includes the right-hand or auxiliary pedal side of the diagram. Note that here, however, the lever 126 does not have a boomerang shape as in the first and second embodiments, but is either straight or has a very slightly angled shape. Here, the lever 126 is straight from its first end 144 to its second end 146. The lever 126 can be coupled to a block 29 by way of a pivot pin 128, which in turn is coupled to a support bracket like that shown at 33 in FIG. 7, which holds the block 29 and the lever 126 to the vehicle's firewall 216. An upper bracket 54 (FIG. 3) can also be provided to hold the top end of the block 29 to the firewall 216.

The auxiliary slave cylinders 122a, 122b shown herein are push-type cylinders, with fluid ports in their non-rod ends. When the auxiliary slave cylinders 122a, 122b are provided with hydraulic fluid from the auxiliary master cylinders 18a, 18b by way of hydraulic lines 20a, 20b, this pushes the pistons 142a, 142b out of the auxiliary slave cylinders 122a, 122b, causing the piston rods 124a, 124b to move outwardly toward the firewall 216. As the first end 144 of the lever 126 that is connected to the piston rods 124a, 124b (for example by way of heim joints) moves away from the firewall 216, the lever 126 pivots about the pivot pin 28, the location of which is fixed with respect to the vehicle 200. This causes the second, opposite end 146 of the lever 126 to rotate toward the primary brake system actuator 206 via the clevis connector 30 and clevis pin/movable member connection similar to that shown in FIG. 9.

Figure 11:
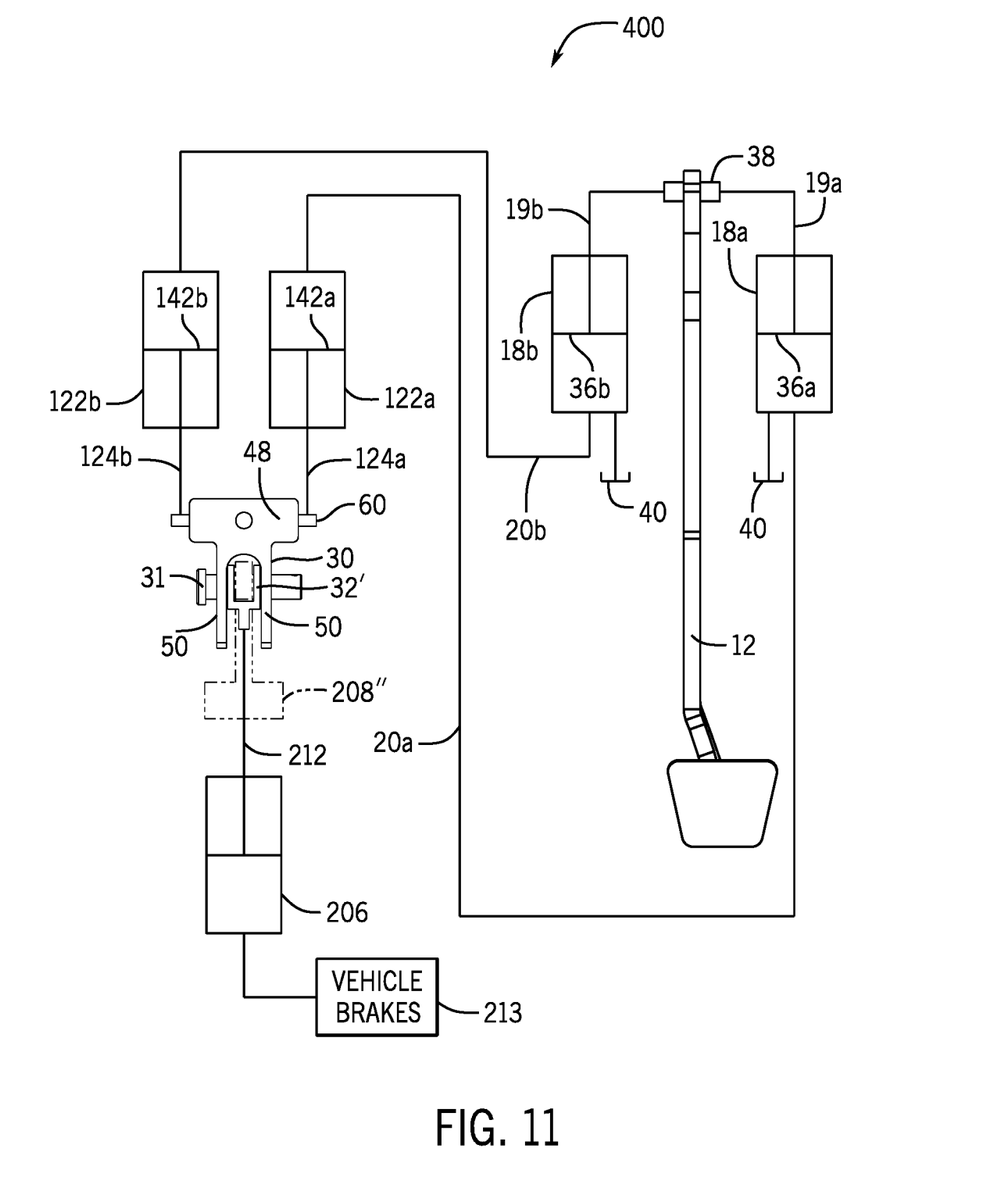
FIG. 11 is a schematic showing hydraulic connections between parts in a fourth embodiment of the supplemental brake actuating assembly.

Referring to FIG. 11, in yet another example, a supplemental brake actuating assembly 400 comprises the same arrangement for the auxiliary brake pedal 12 and auxiliary master cylinders 18a, 18b as in the above examples. The auxiliary slave cylinders 122a, 122b are the push-type as shown and described with respect to FIG. 10. However, in this fourth embodiment, the assembly includes a clevis connector 30 coupled to the auxiliary slave cylinders' pistons 142a, 142b. This can be done by way of connecting heim joints at the ends of the piston rods 124a, 124b to a pin or bar 60 that passes through or is otherwise connected to the base 48 of the clevis connector 30. The clevis connector 30 thus moves in response to hydraulic fluid being provided to or removed from the auxiliary slave cylinders 122a, 122b. The clevis connector 30 is coupled to and applies force to the movable member 32' as the clevis connector 30 moves (for example, by way of pin 31 extending through both the prongs 50 of the clevis connector 30 and the prongs of the clevis-shaped movable member 32'), thereby applying force to the rod 212 of the primary brake system actuator 206.

Figure 12:
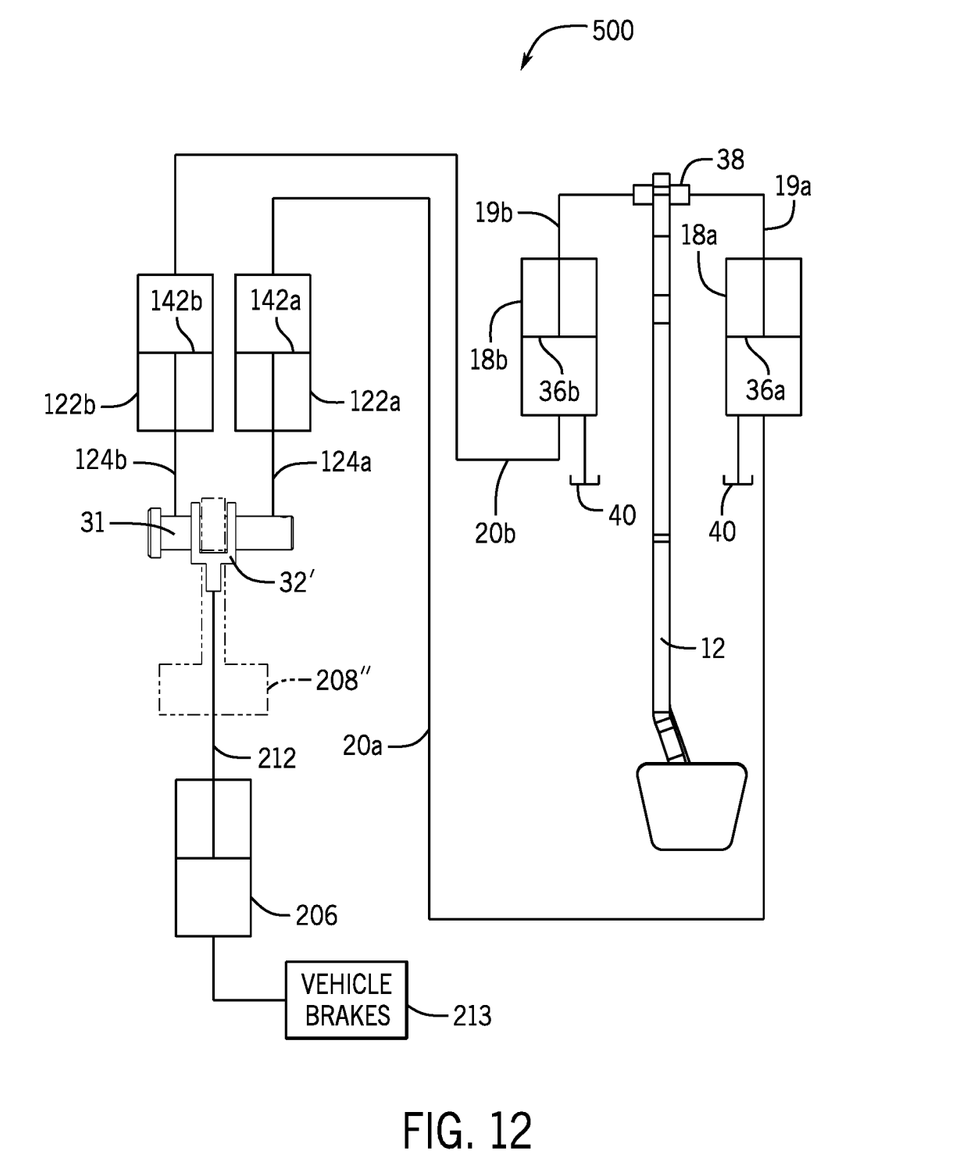
FIG. 12 is a schematic showing hydraulic connections between parts in a fifth embodiment of the supplemental brake actuating assembly.

Referring to FIG. 12, a fifth embodiment of a supplemental brake actuating assembly 500 according to the present disclosure also comprises the same arrangement for the auxiliary brake pedal 12 and auxiliary master cylinders 18a, 18b, as well as the push-type auxiliary slave cylinders 122a, 122b. However, here the pin 31 is coupled to the auxiliary slave cylinders' pistons 142a, 142b, for example by way of heim joints on the piston rods 124a, 124b attaching around the outer circumference of the pin 31. Thus, the pin 31 moves in response to hydraulic fluid being provided to or removed from the auxiliary slave cylinders 122a, 122b. Because the pin 31 is also coupled to the clevis-shaped movable member 32' by way of its prongs, as described herein above with respect to FIG. 9, the pin 31 applies force to the movable member 32' as the pin 31 moves, thereby applying force to the rod 212 of the primary brake system actuator 206.

The assemblies 10, 100, 300, 400, 500 of the present disclosure can be used as part of a modified brake system for a vehicle 200. The system includes a primary brake system actuator 206 controlling brakes 213 of the vehicle 200 in response to pivoting of a primary brake pedal 208, 208', 208". A movable member 32, 32' applies force directly to a rod 212 of the primary brake system actuator 206 as the primary brake pedal 208, 208', 208" pivots. An auxiliary brake pedal 12 is pivotally coupled to the vehicle 200 at a location that is remote from the primary brake system actuator 206. An auxiliary master cylinder 18a, 18b having a piston 36a, 36b that is actuated by pivoting of the auxiliary brake pedal 12 and an auxiliary slave cylinder 22a, 22b, 122a, 122b having a piston 42a, 42b, 142a, 142b coupled to the movable member 32, 32' are also provided. A hydraulic line 20a, 20b couples the auxiliary master cylinder 18a, 18b to the auxiliary slave cylinder 22a, 22b, 122a, 122b and provides hydraulic fluid to the auxiliary slave cylinder 22a, 22b, 122a, 122b from the auxiliary master cylinder 18a, 18b or removes hydraulic fluid from the auxiliary slave cylinder 22a, 22b, 122a, 122b to the auxiliary master cylinder 18a, 18b in response to actuation of the auxiliary master cylinder's piston 36a, 36b. Movement of the auxiliary slave cylinder's piston 42a, 42b, 142a, 142b as hydraulic fluid is provided to or removed from the auxiliary slave cylinder 22a, 22b, 122a, 122b applies force to the movable member 32, 32' at a same location where actuation of the primary brake pedal 208, 208', 208" would otherwise apply force to the movable member 32, 32', thereby applying force to the rod 212 of the primary brake system actuator 206.

The assemblies 10, 100, 300, 400, 500 of the present disclosure can be installed on different types of vehicles. For example, the types of assemblies shown in the fourth and fifth embodiments FIGS. 11 and 12 would be reasonably easy to package on a conventional-style truck, whereas on a cab-over-engine truck, forward space is limited and some sort of lever as shown in the first, second, or third embodiments of FIGS. 1-10 might be desirable to package the assembly. The assemblies 10, 100, 300, 400, 500 can have various geometries and configurations and can connect to the vehicle body via different types of support brackets. This flexibility makes retrofitting a vehicle with a supplemental brake pedal remote from the OEM primary brake pedal 208 achievable for many different types of vehicles and OEM brake systems. Although the present assemblies 10, 100, 300, 400, 500 have been described with respect to a hydraulic OEM brake system, the assemblies of the present disclosure could also be used to actuate pneumatic OEM brake systems. By providing auxiliary master cylinders near the auxiliary brake pedal and auxiliary slave cylinders coupled to a lever and clevis near the OEM brake pedal, any difficulties encountered with having to cut into the existing brake system can be avoided.

This written description uses examples of the present disclosure, including the best mode, and enables any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Each limitation in the appended claims is intended to invoke interpretation under 35 U.S.C. §112(f), only if the terms "means for" or "step for" are explicitly recited in the respective limitation. In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other assemblies. It is to be expected that various equivalents, alternatives and modifications are possible within the scope of the appended claims.

What is claimed is:

1. An assembly for actuating a brake system of a vehicle from a dual-driver position, the assembly comprising:
an auxiliary brake pedal pivotally coupled to the vehicle remotely from a location of a primary brake pedal associated with the brake system;
an auxiliary master cylinder having a piston that is actuated by pivoting of the auxiliary brake pedal;
a hydraulic line coupling the auxiliary master cylinder to an auxiliary slave cylinder and providing hydraulic fluid to the auxiliary slave cylinder from the auxiliary master cylinder or removing hydraulic fluid from the auxiliary slave cylinder to the auxiliary master cylinder in response to actuation of the auxiliary master cylinder's piston;
a lever pivotally coupled to the vehicle proximate the location of the primary brake pedal and having a first end coupled to the auxiliary slave cylinder, the lever pivoting in response to provision or removal of hydraulic fluid to or from the auxiliary slave cylinder; and
a connector coupled to a second, opposite end of the lever and moveable with the lever as the lever pivots;
wherein the connector is configured to be coupled to a movable member that directly applies force to a rod of a primary brake system actuator associated with the primary brake pedal; and
wherein the connector is configured to apply force to the movable member at a same location where actuation of the primary brake pedal would otherwise apply force to the movable member.

2. The assembly of claim 1, wherein the connector is a clevis.

3. The assembly of claim 2, wherein a base of the clevis is coupled to the second end of the lever by a pivot pin, and prongs of the clevis are situated on opposite sides of the movable member and coupled thereto by a clevis pin.

4. The assembly of claim 3, wherein the lever has a bend between the first and second ends thereof and pivots about a generally vertical axis located at the bend.

5. The assembly of claim 4, wherein the lever is coupled to an exterior side of a firewall of the vehicle in front of the primary brake pedal, and the clevis extends from the exterior side of the firewall to an interior side of the firewall.

6. The assembly of claim 4, wherein the auxiliary slave cylinder, the lever, and the clevis are coupled to the vehicle beneath the primary brake pedal.

7. The assembly of claim 3, wherein the lever is straight from the first end to the second end and pivots about a generally vertical axis located approximately halfway between the first and second ends.

8. The assembly of claim 1, further comprising:
a pair of auxiliary master cylinders, each auxiliary master cylinder having a piston that is actuated by pivoting of the auxiliary brake pedal;
a pair of auxiliary slave cylinders, each auxiliary slave cylinder being coupled to the first end of the lever; and
a pair of hydraulic lines respectively coupling the pair of auxiliary master cylinders to the pair of auxiliary slave cylinders;
wherein the pair of hydraulic lines respectively provide hydraulic fluid to or remove hydraulic fluid from the pair of auxiliary slave cylinders in response to actuation of the respective pistons of the auxiliary master cylinders.

9. The assembly of claim 8, further comprising a hydraulic fluid reservoir in fluid communication with each auxiliary master cylinder in the pair of auxiliary master cylinders.

10. The assembly of claim 1, wherein, in response to application of not less than 15 pounds and not more than 150 pounds of operator force to the auxiliary brake pedal, the assembly is configured to cause the connector to apply force to the movable member that is sufficient to actuate the movable member.

11. A modified brake system for a vehicle, the system comprising:
a primary brake system actuator controlling brakes of the vehicle in response to pivoting of a primary brake pedal;
a movable member that directly actuates a rod of the primary brake system actuator as the primary brake pedal pivots;
an auxiliary brake pedal pivotally coupled to the vehicle at a location that is remote from the primary brake system actuator;
an auxiliary master cylinder having a piston that is actuated by pivoting of the auxiliary brake pedal;
an auxiliary slave cylinder having a piston coupled to the movable member; and
a hydraulic line coupling the auxiliary master cylinder to the auxiliary slave cylinder and providing hydraulic fluid to the auxiliary slave cylinder from the auxiliary master cylinder or removing hydraulic fluid from the auxiliary slave cylinder to the auxiliary master cylinder in response to actuation of the auxiliary master cylinder's piston;
wherein movement of the auxiliary slave cylinder's piston as hydraulic fluid is provided to or removed from the auxiliary slave cylinder applies force to the movable member at a same location where actuation of the primary brake pedal would otherwise apply force to the movable member, thereby applying force to the rod of the primary brake system actuator.

12. The system of claim 11, further comprising:
a lever pivotally coupled to the vehicle proximate the primary brake system actuator and having a first end coupled to the auxiliary slave cylinder's piston, the lever pivoting in response to hydraulic fluid being provided to or removed from the auxiliary slave cylinder; and
a connector coupled to a second, opposite end of the lever and moveable with the lever as the lever pivots;
wherein the connector is coupled to and applies force to the movable member as the lever pivots, thereby applying force to the rod of the primary brake system actuator.

13. The system of claim 12, wherein the connector is a clevis.

14. The system of claim 13, wherein a base of the clevis is coupled to the second end of the lever by a pivot pin, and prongs of the clevis are situated on opposite sides of the movable member and coupled thereto by a clevis pin.

15. The system of claim 14, wherein the lever is coupled to an exterior side of a firewall of the vehicle in front of the primary brake pedal, and the clevis extends from the exterior side of the firewall to an interior side of the firewall.

16. The system of claim 15, wherein the lever has a bend between the first and second ends thereof and pivots about a generally vertical axis located at the bend.

17. The system of claim 16, wherein the auxiliary slave cylinder is a pull-type cylinder.

18. The system of claim 12, further comprising:
a pair of auxiliary master cylinders, each auxiliary master cylinder having a piston that is actuated by pivoting of the auxiliary brake pedal;
a pair of auxiliary slave cylinders, each auxiliary slave cylinder being coupled to the first end of the lever; and
a pair of hydraulic lines respectively coupling the pair of auxiliary master cylinders to the pair of auxiliary slave cylinders;
wherein the pair of hydraulic lines respectively provide hydraulic fluid to or remove hydraulic fluid from the pair of auxiliary slave cylinders in response to actuation of the respective pistons of the auxiliary master cylinders.

19. The system of claim 18, further comprising a hydraulic fluid reservoir in fluid communication with each auxiliary master cylinder in the pair of auxiliary master cylinders.

20. The system of claim 11, wherein the primary brake system actuator is a master cylinder.

21. The system of claim 11, further comprising a clevis coupled to the auxiliary slave cylinder's piston, the clevis moving in response to hydraulic fluid being provided to or removed from the auxiliary slave cylinder;
    wherein the clevis is coupled to and applies force to the movable member as the clevis moves, thereby applying force to the rod of the primary brake system actuator.

22. The system of claim 11, further comprising a pin coupled to the auxiliary slave cylinder's piston, the pin moving in response to hydraulic fluid being provided to or removed from the auxiliary slave cylinder;
    wherein the pin is coupled to and applies force to the movable member as the pin moves, thereby applying force to the rod of the primary brake system actuator.

\* \* \* \* \*